United States Patent [19]
Lo et al.

[11] Patent Number: 6,134,831
[45] Date of Patent: Oct. 24, 2000

[54] SPROUT CULTIVATION BOX WITH AN AUTOMATIC WATER REGULATING AND BALANCING DEVICE

[76] Inventors: Kung-Shen Lo, No. 1-1, Lane 25, Min Chih St., Chung Ho, Taipei Hsien; Li-Tai Peng, 3F, No. 2-3, Alley 4, Lane 190, Sec. 7, Chung Shan N. Rd., Taipei, both of Taiwan

[21] Appl. No.: 09/075,251

[22] Filed: May 11, 1998

[51] Int. Cl.⁷ .................................................. A01G 31/06
[52] U.S. Cl. ............................................................ 47/61
[58] Field of Search .................................. 47/14, 60, 61, 47/62 N, 63

[56] References Cited

U.S. PATENT DOCUMENTS

| | | | |
|---|---|---|---|
| 5,636,474 | 6/1997 | Lo | 47/61 |
| 5,822,920 | 10/1998 | Tsay | 47/61 |

*Primary Examiner*—Michael J. Carone
*Assistant Examiner*—Jeffrey L. Gellner
*Attorney, Agent, or Firm*—Smith, Gambrell & Russell, LLP

[57] ABSTRACT

A sprout cultivation box with an automatic water regulating and balancing device provides a precise-controlled, automatic, and complete cultivation environment for performing continually the soakage, sprouting, and cultivating processes of beans or seeds within the box, and for saving the water resources as well as the cost at no price of the quality and production. The present invention comprise a reinforce box capable for duplicate stacking, a permeable elastic cover, a carrier plate with a plurality of tiny compartments for anchoring beans, an elastic engaging means for rapidly connecting and disconnecting the permeable elastic cover from the box, and the water-feeding device for precisely and automatically regulating the water circulation inside the sprout cultivation box.

11 Claims, 14 Drawing Sheets

SPROUT CULTIVATION BOX WITH AN AUTOMATIC WATER REGULATING AND BALANCING DEVICE

BACKGROUND OF THE INVENTION (1) Field of the Invention

The invention relates to a sprout cultivation box with an automatic water regulating and balancing device, and more particularly to one which can carry out intensive sprout cultivation, precise water irrigation, and growth control of the sprout, for promoting the production and the quality of sprout cultivation.

(2) Description of the Prior Art

Conventionally, three types of water feeding in sprout cultivating agriculture are usually seen; they are showering, spraying, and soaking. For mass production requirements, well controlled water feeding is necessary to ensure product quality. In this case, showering and spraying are usually not pertinent to providing well controlled water feeding. However, though the soaking for sprout cultivation could provide better production quality, its disadvantages of huge water consumption, temperature gradient of the circulating water, and the difficulty in timing for water feeding are sometimes hard to handle well. As a result, heterogeneous sprout production and bacteria contamination can be expected.

Furthermore, in response to various bean (such as green bean, soybean, small red bean, pea, . . . and so on) applications, various water consumption and the feeding timing in a unique cultivation container for soakage, sprouting, and growing are sometimes hard to achieve. Frequently the container must be changed in order to guarantee the sprout quality.

Therefore, an invention devoted to resolving aforesaid disadvantages of current cultivation practice in automatic water feeding and for saving in labor, time, and water is necessary.

SUMMARY OF THE INVENTION

Accordingly, it is a primary object of the present invention to provide a sprout cultivation box with an automatic water regulating and balancing device for precisely controlling the water feeding, balancing the circulating water, and decreasing the water consumption.

The sprout cultivation box with an automatic water regulating and balancing device in accordance with the present invention provides an elastic cover with concave bottom surface for forming a well cultivation space in between with the chocolate board-shaped carrier plate and for preventing arbitrary movement of the beans inside. While the sprout is growing, the elastic cover on top will be lifted but will increase the restraint atop the sprout by a well-designed spring belt to thus enhance the self-generating of a special natural chemical for improving the growth quality of the cultivated sprout. Also, the spring belt can provide a preferred constraint for inhibiting the shaking of a cultivation unit in the cultivation box.

It is another object of the present invention to provide a sprout cultivation box with an automatic water regulating and balancing device, which comprises a water-feeding device for precisely and automatically regulating the water circulation inside the sprout cultivation box in all three stages of soaking, sprouting, and cultivating. By providing the well designed water-feeding device and the elastic cover, the sprout growth can be prospective and greatly improved in quality and production.

It is a further object of the present invention to provide a sprout cultivation box with an automatic water regulating and balancing device, which the water-feeding device can be optimally arranged via various stacking methods in a plural usage of the cultivation boxes to meet any application field situation.

It is one more object of the present invention to provide a sprout cultivation box with an automatic water regulating and balancing device which comprises an elastic engaging means for rapidly connecting and disconnecting the spring belts.

It is another object of the present invention to provide a sprout cultivation box with an automatic water regulating and balancing device, in which the elastic cover further includes pairs of hook sets along opposing lateral sides thereof and corresponding reinforce protective plates facing outward from each hook housing, for preventing the elastic cover from colliding while in transportation or handling and for increasing the lifetime of the cultivation boxes.

All these objects are achieved by the sprout cultivation box with an automatic water regulating and balancing device described below.

BRIEF DESCRIPTION OF THE DRAWINGS

The present invention will now be specified with reference to its. preferred embodiments illustrated in the drawings, in which.

DESCRIPTION OF THE PREFERRED EMBODIMENTS

The invention disclosed herein is directed to a sprout cultivation box with an automatic water regulating and balancing device. In the following description, numerous details are set forth in order to provide a thorough understanding of the present invention. It will be appreciated by one skilled in the art that variations of these specific details are possible while still achieving the results of the present invention. In same instances, well-known components are not described in detail in order not to unnecessarily obscure the present invention.

The sprout cultivation box with an automatic water regulating and balancing device in accordance with the present invention is the work designed by well-performing automatic planning and proved to be outstanding by undergoing intensive field testing. The engagement of a cultivation box 4 with a water-feeding device 7 is through the connection of an air-powering water feeding connector 74 with an extruding external water adopter 43 of the cultivation box 4, for providing a superior cultivating environment for rapid sprout growing without any intermediate place change.

Figures 1, 1A, 1B:
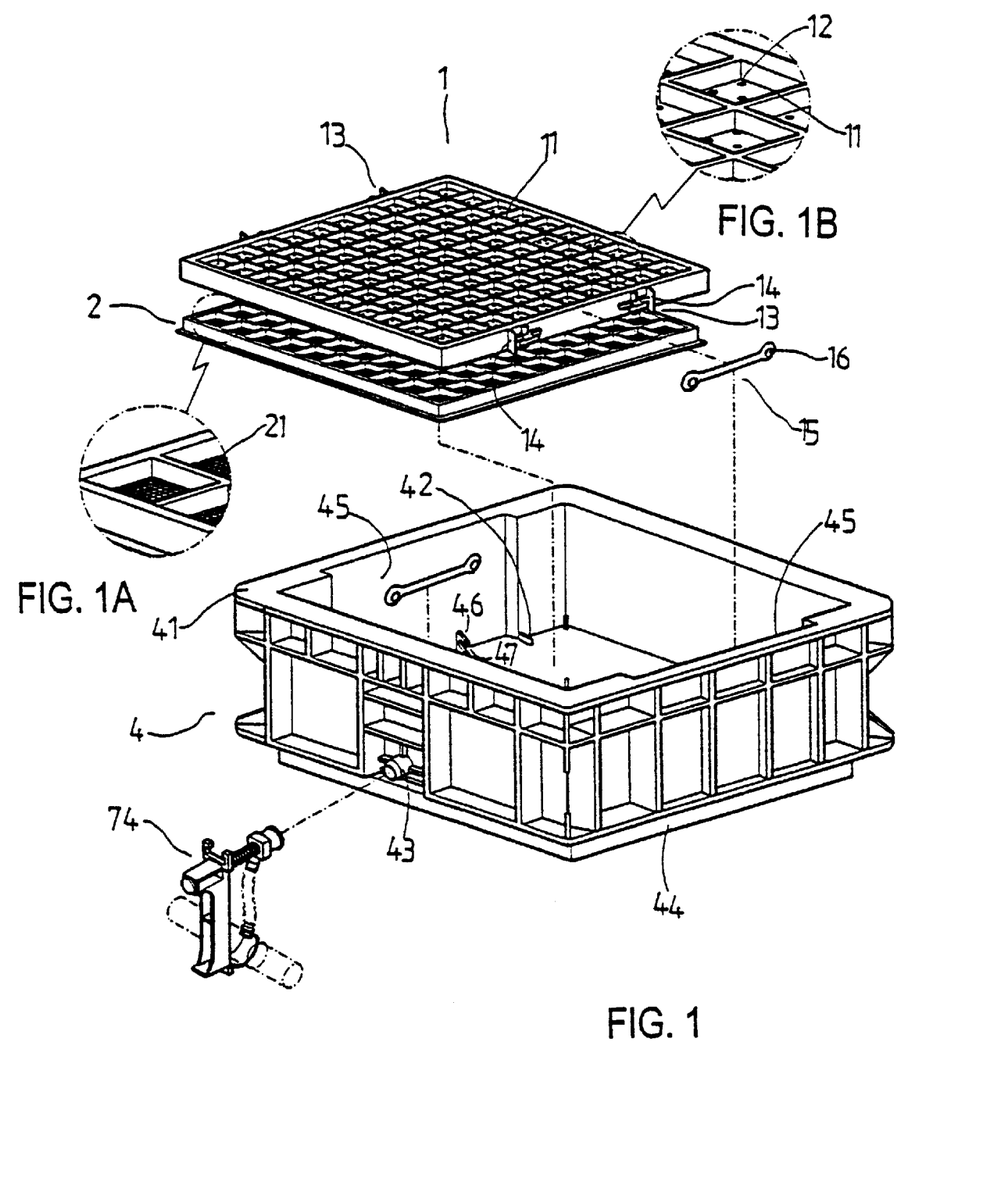
FIG. 1 is an exploded perspective view of the preferred cultivation box and a water feeding connector in accordance with the present invention.
FIG. 1A is an enlarged view of the plastic cover showing the reinforce ribs and the air holes.
FIG. 1B is an enlarged view of the carrier plate showing the compartments.

Referring now to FIG. 1, the cultivation box 4 has a permeable elastic cover 1 on top. The permeable elastic cover 1 for providing elastic restraint atop to enhance the sprout growth via self-inducing interior helpful chemicals further has a plurality of inter-cross and equal-spaced interior reinforce ribs 11 integrated as a whole and a plurality of air holes 12 on the bottom of the elastic cover 1 for permeation of air as well as water. In addition, the elastic cover 1 further comprises a pair of hook sets 13 located each thereof at an opposing lateral side for firm connection with spring belts 15 through its aperture at the ring end 16. Each hook set 13 further comprises a wider, stronger, and extruding protective plate 14 for preventing the elastic cover 1 from exterior collision. According to the present invention, the spring belt 15 can be made of rubber, plastic, a tensile spring with both ring ends, or the like.

According to the present invention, the cultivation box 4 further comprises a carrier plate 2, which is like a containing dish and has an extruding step-shaped edge to engage with the elastic cover 1 on top. The carrier plate 2 further has a plurality of tiny compartments 21 at each corresponding position to the inter-cross interior ribs 11 of the engaging permeable elastic cover 1 for anchoring beans in the tiny enclosed space formed in between the engaging carrier plate 2 and the elastic cover 1. The height of the compartment 21 can be about the thickness of the cultivating bean after soakage. Such an arrangement of the elastic cover 1 and the carrier plate 2 inhibits beans in the compartments 21 from arbitrary motion and overlapping, which will be helpful to the beans' rooting or the cutoff of the roots.

Figure 7A:
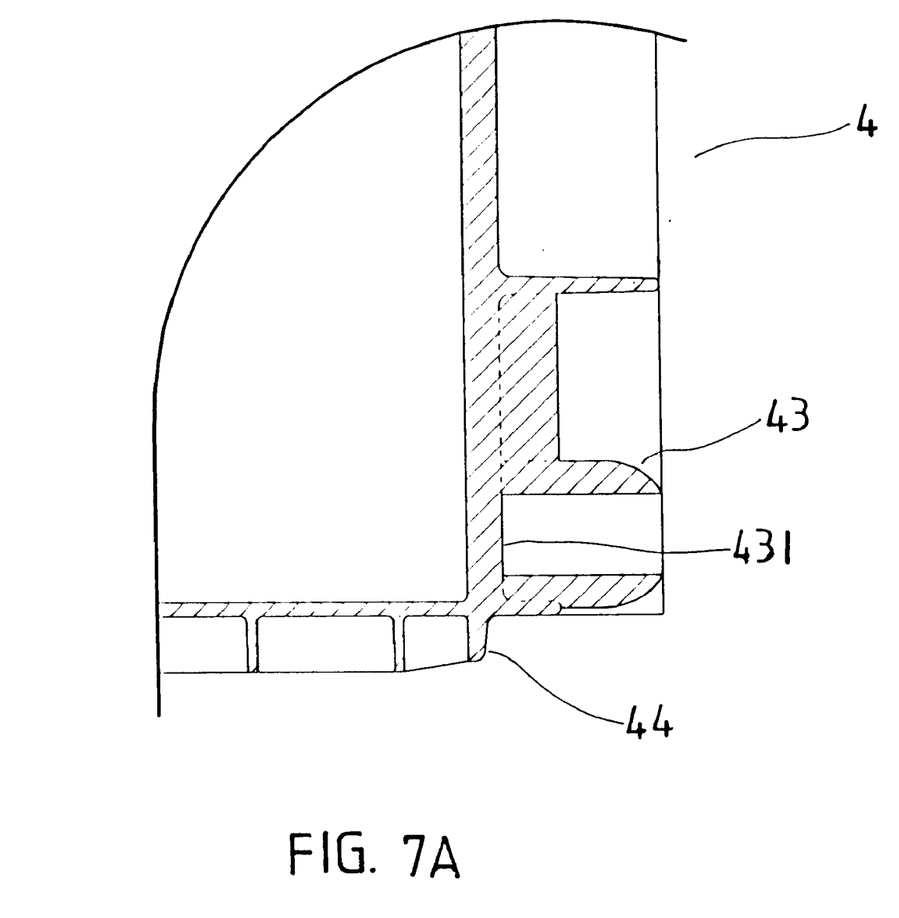
FIG. 7A is a cross section view of a potion of the preferred cultivation box according to the present invention, showing the preferred extruding external water adopter with a filtering screen installed.
Figure 7B:
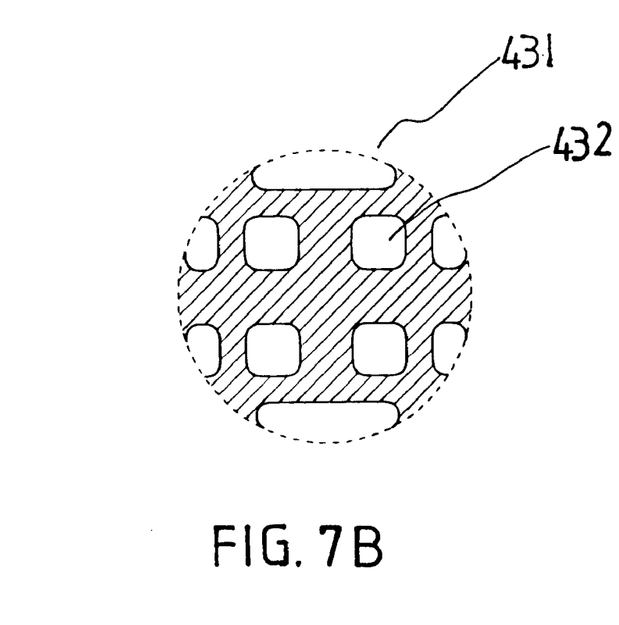
FIG. 7B is a schematic view of the preferred filtering screen according to the present invention.

The cultivation box 4, which is essentially a weight-saving and reinforce box with one side open, has an upper flange 41 located atop and a lower flange 44 located exterior to the bottom edge for duplicate staking on top of another cultivation box 4. At one external side of the cultivation box 4, an extruding external water adapter 43 (also as shown in FIG. 7A) is located at a height over the interior bottom surface of the cultivation box 4. The external water adapter 43 further has a filtering screen 431 with an integrated filtering hole 432 for restraining the bean shells within the cultivation box 4 without being an obstacle to the water circulation. At the interior bottom edge of the cultivation box 4, a plurality of equal-height spacing bumps 42 are located for providing a substantial spacing between the bottom surface with the carrier plate 2 atop to accommodate sufficient amount of water for the downward extruding root of the bean in the compartment 21. In addition, the cultivation box 4 filer comprises a pair of shallow square valleys 45 located interior on opposing side wall for providing enough space to accommodate the hook sets 13 of the elastic cover 1. Preferably, the square valley 45 further provides at least an anchoring set 46 with a hooking end 47 between the valley wall and the hook set 13 after installation, for positioning the spring belt 15.

Figure 2:
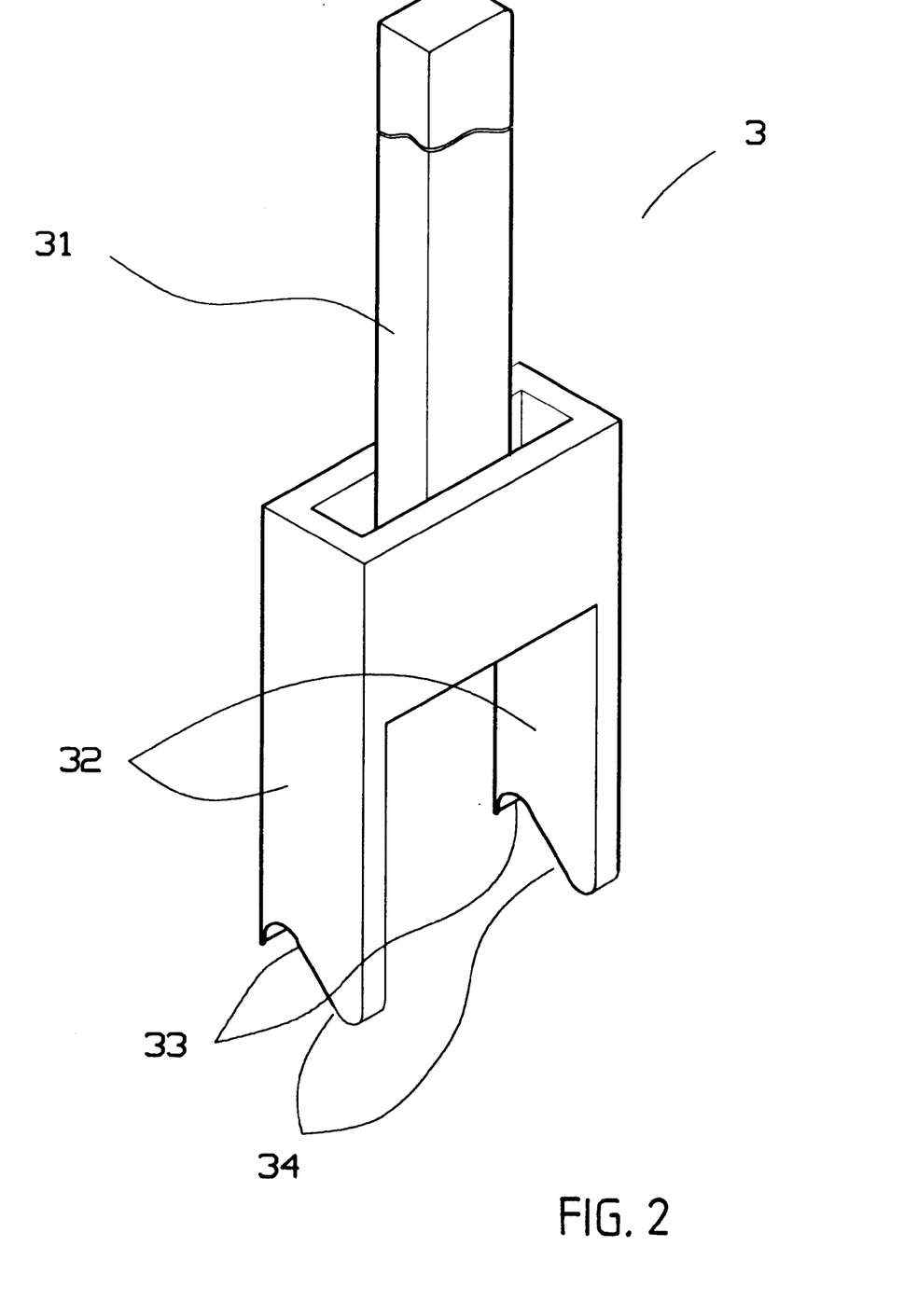
FIG. 2 is a perspective view of the preferred elastic engaging means according to the present invention.
Figure 3A:
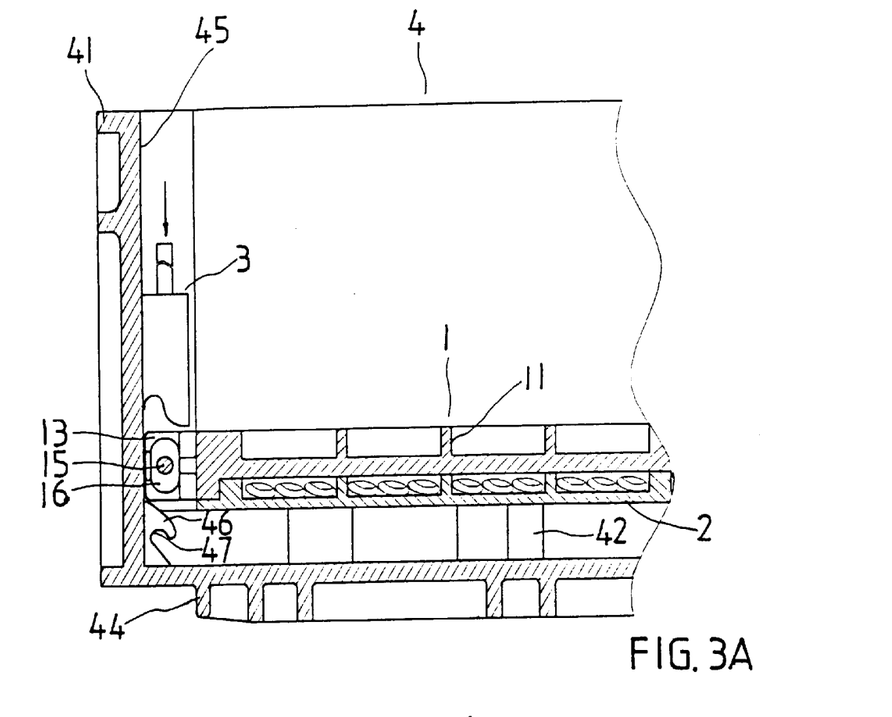
FIG. 3A is a cross section view of a portion of the preferred cultivation box according to the present invention with beans inside, showing the elastic engaging means engaging.
Figure 3B:
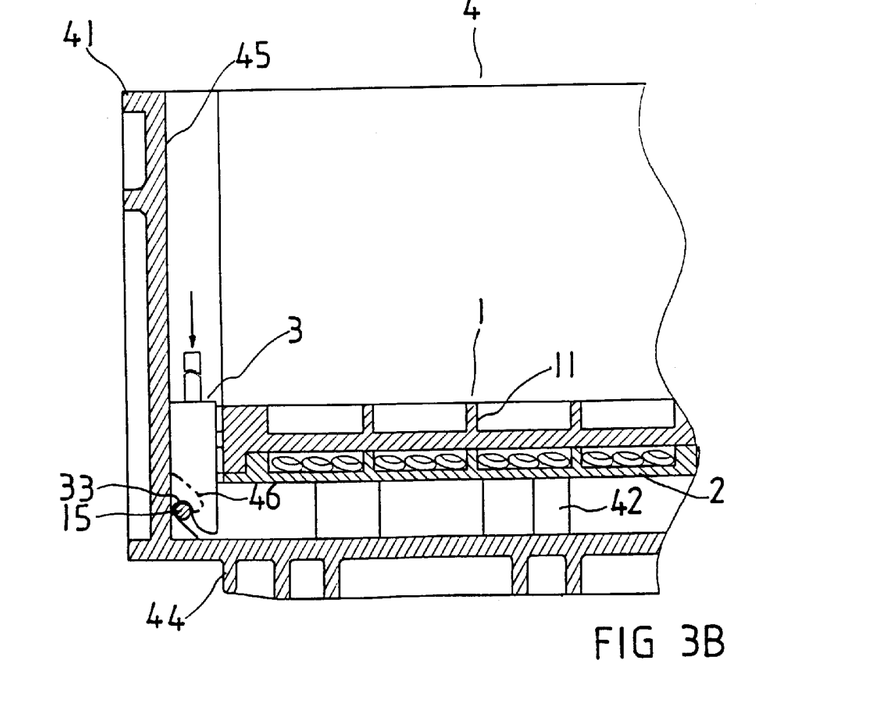
FIG. 3B is a cross section view of a potion of the preferred cultivation box according to the present invention with beans inside, showing the elastic engaging means engaged.
Figure 4:
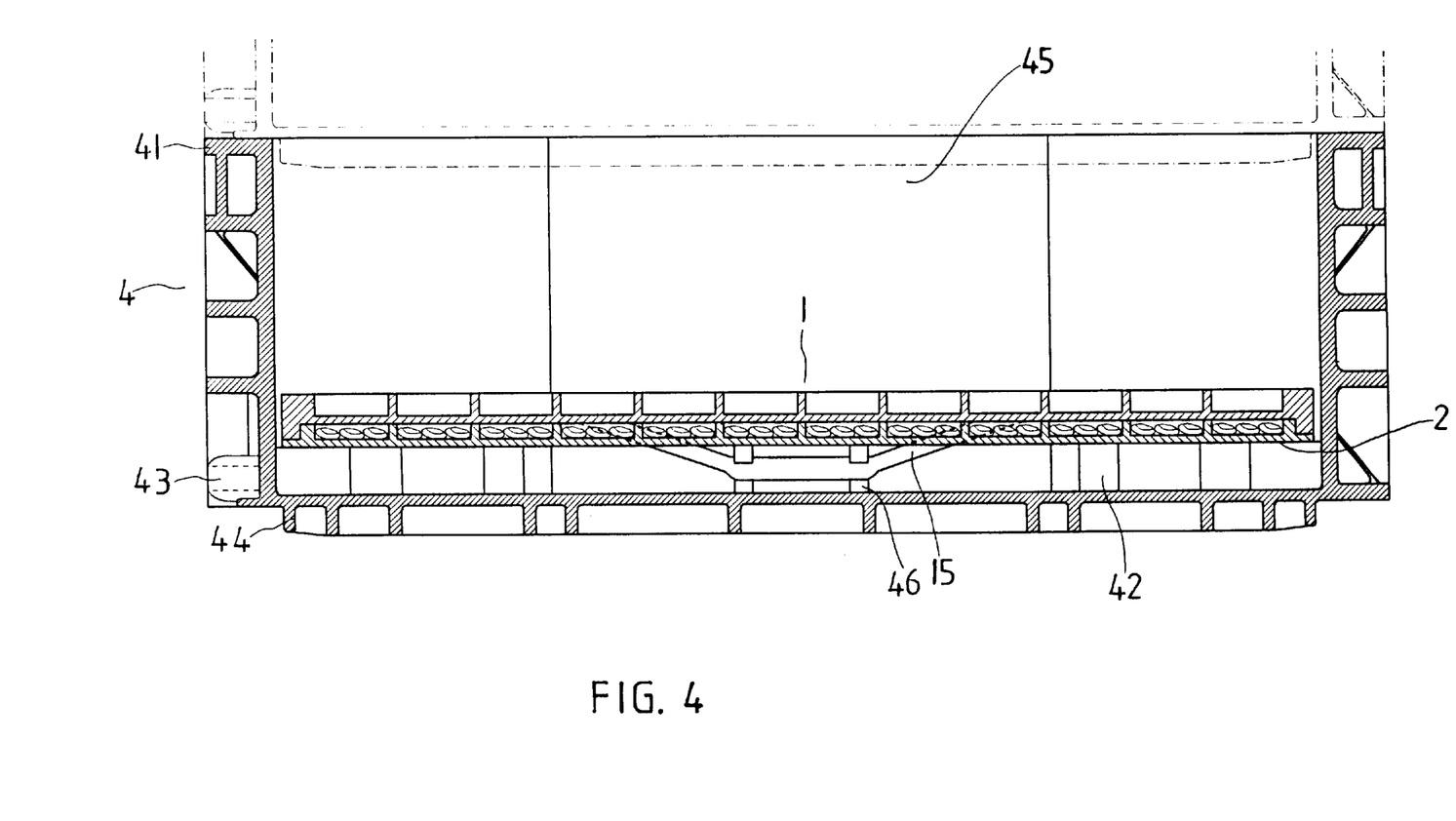
FIG. 4 is a cross section view of the preferred cultivation box according to the present invention with beans insides, viewing at an angle 90 degree to one shown in FIG. 3.

Referring now to FIG. 3A and FIG. 3B, while after the placement of beans in the cultivation box 4, an elastic engaging means 3 (as shown in FIG. 2) can be used to perform the firm engagement of cultivation unit (including the elastic cover 1 and the carrier plate 2) and the anchoring sets 46, in order to resolve the floating problem after water feeding and the resistance from the sprout growth. In accordance with the present invention, the elastic engaging means 3 for rapidly connecting and disconnecting the spring belts 15, comprises a maneuvering bar 31 extending downward and separating to form a pair of across plates 32, and each of the across plate 32 further comprises a locating cut 33 and an extruding release tip 34 at the bottom end. The locating cut 33 is used to press down one end of the spring belt 15 fastened to the hook set 13 of the elastic cover 1 at another end, and to slip the end into the hooking end 47 of the anchoring set 46 for anchoring the cultivation unit (as illustrated in FIG. 3A and FIG. 3B). Preferably in an automated application, the maneuvering bar 31 of the elastic engaging means 3 can be operated by a robot with proper rotational capability.

Figure 5:
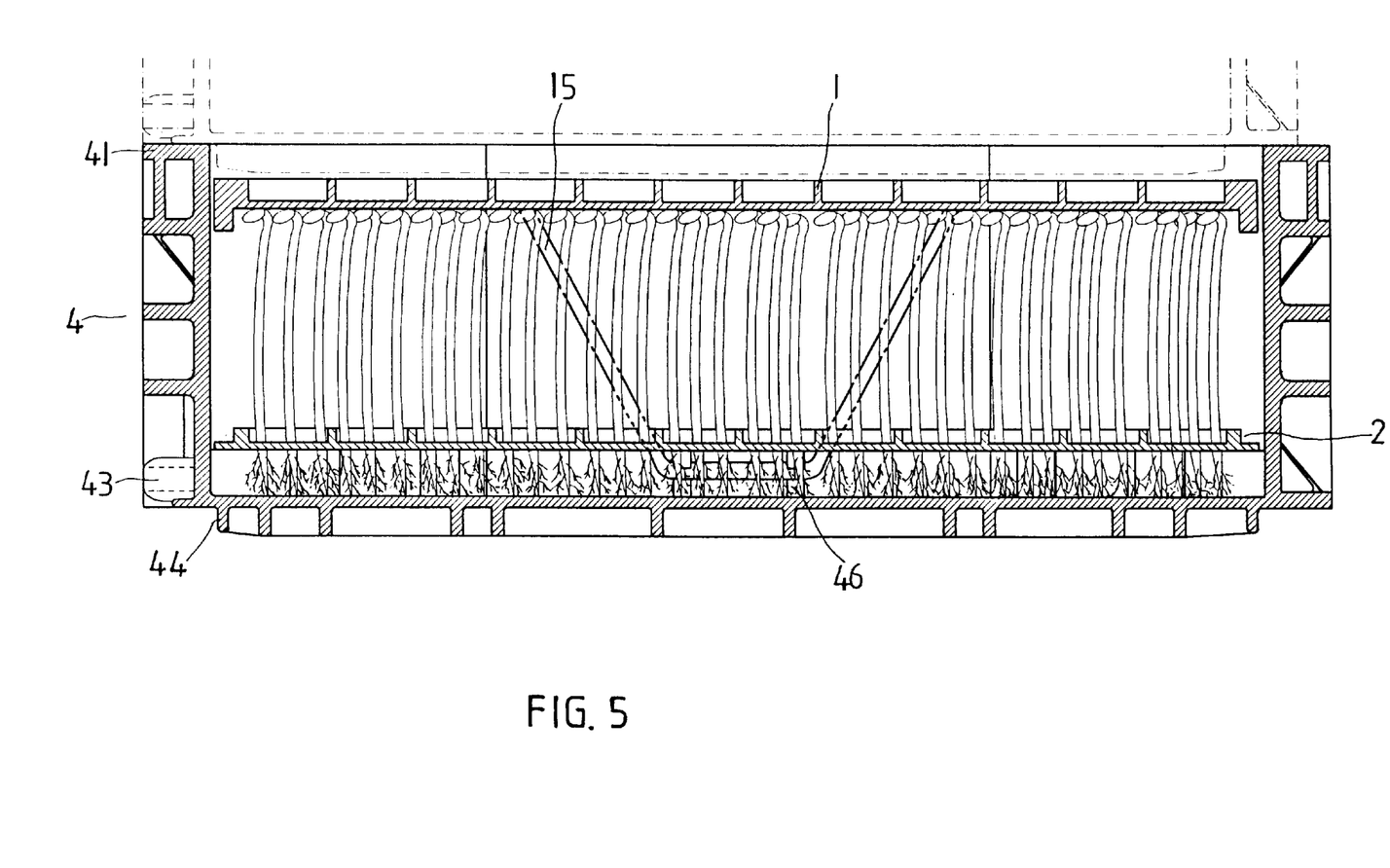
FIG. 5 is a cross section view of the preferred cultivation box according to the present invention with fully growing sprouts.
Figure 6A:
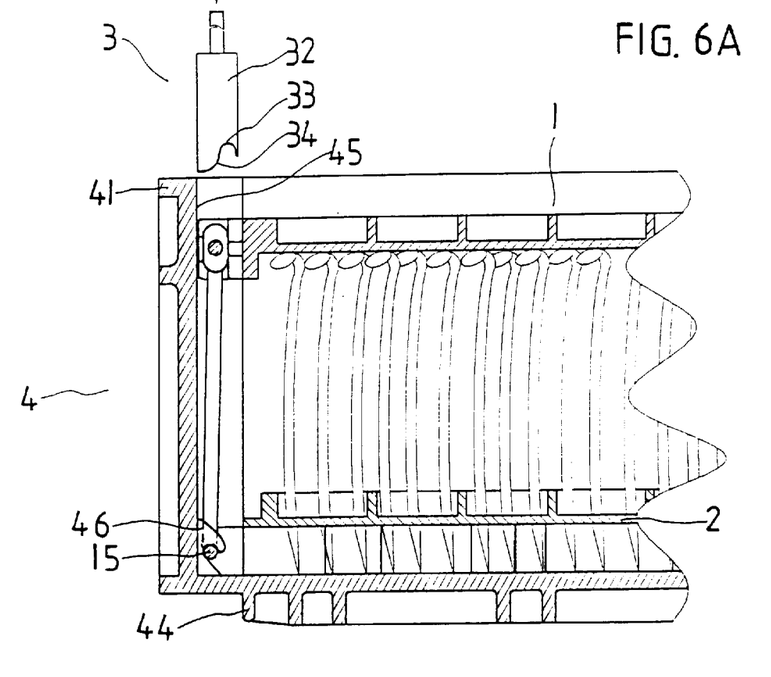
FIG. 6A is a cross section view of a potion of the preferred cultivation box according to the present invention with fully growing sprouts, showing the spring belt still engaged inside the cultivation box.
Figure 6B:
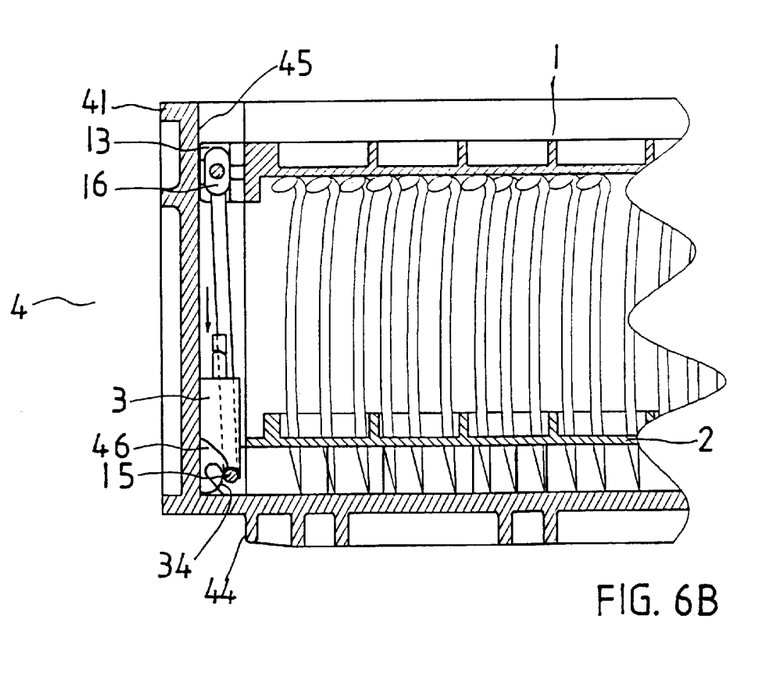
FIG. 6B is a cross section view of a potion of the preferred cultivation box according to the present invention with fully growing sprouts, showing the elastic engaging means engaging for dis-assembling the spring belt.

Referring now to FIG. 5, after the sprout grows to a substantial height, the elastic engaging means 3 can be rotated 180 degree to release the spring belt 15 from the anchoring set 46 as illustrated in FIG. 6A and FIG. 6B. The cultivation unit, then, can be transported to another station for de-rooting.

Figure 8:
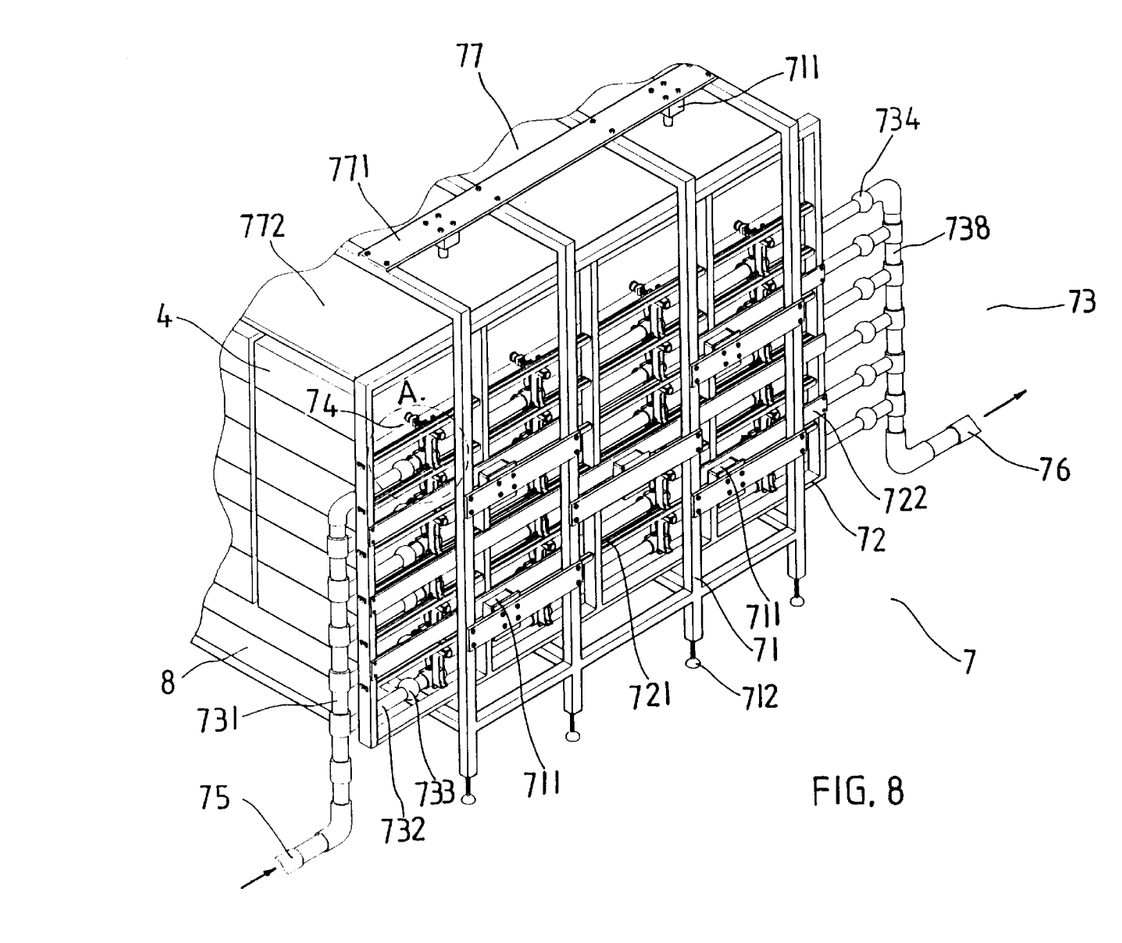
FIG. 8 is a schematic view of the preferred embodiment of piling a plurality of the cultivation boxes according to the present invention.
Figure 9:
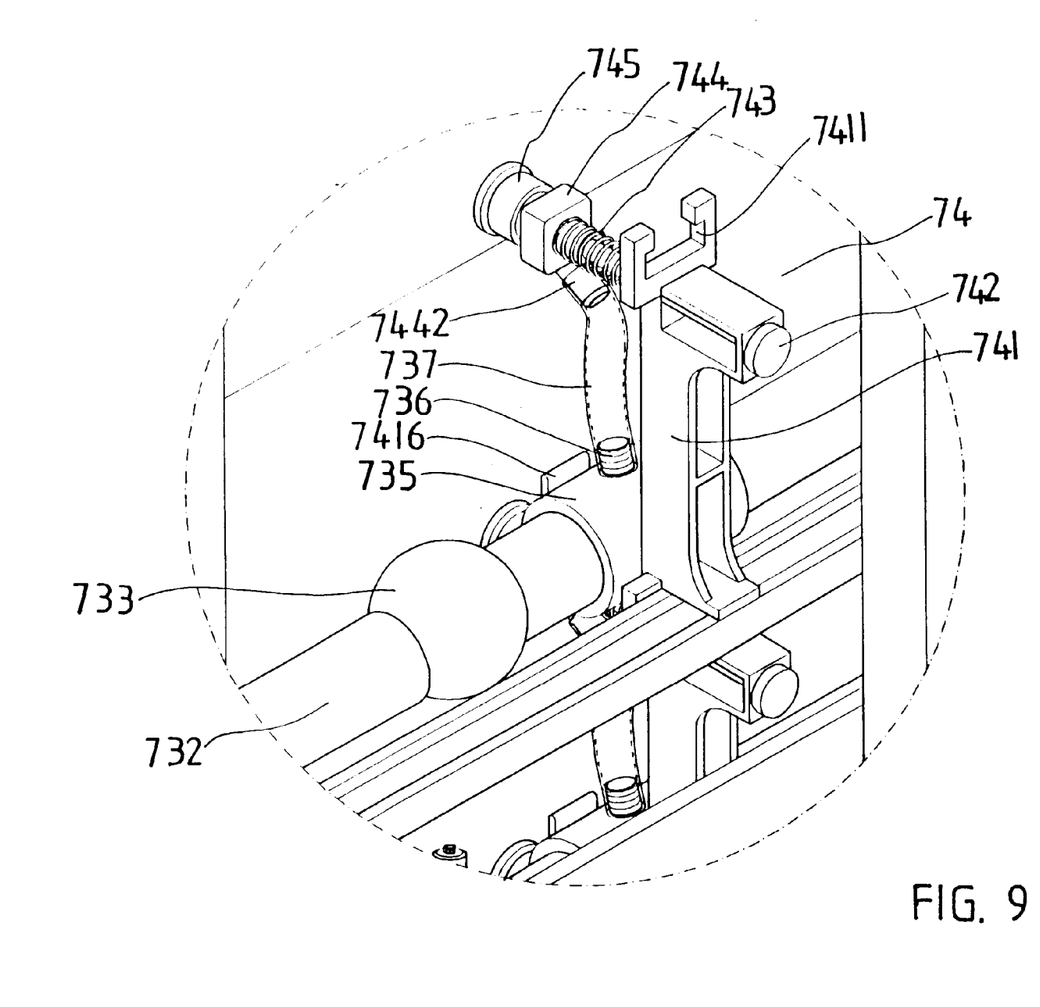
FIG. 9 is an enlarged view of portion A in FIG. 8.
Figure 10:
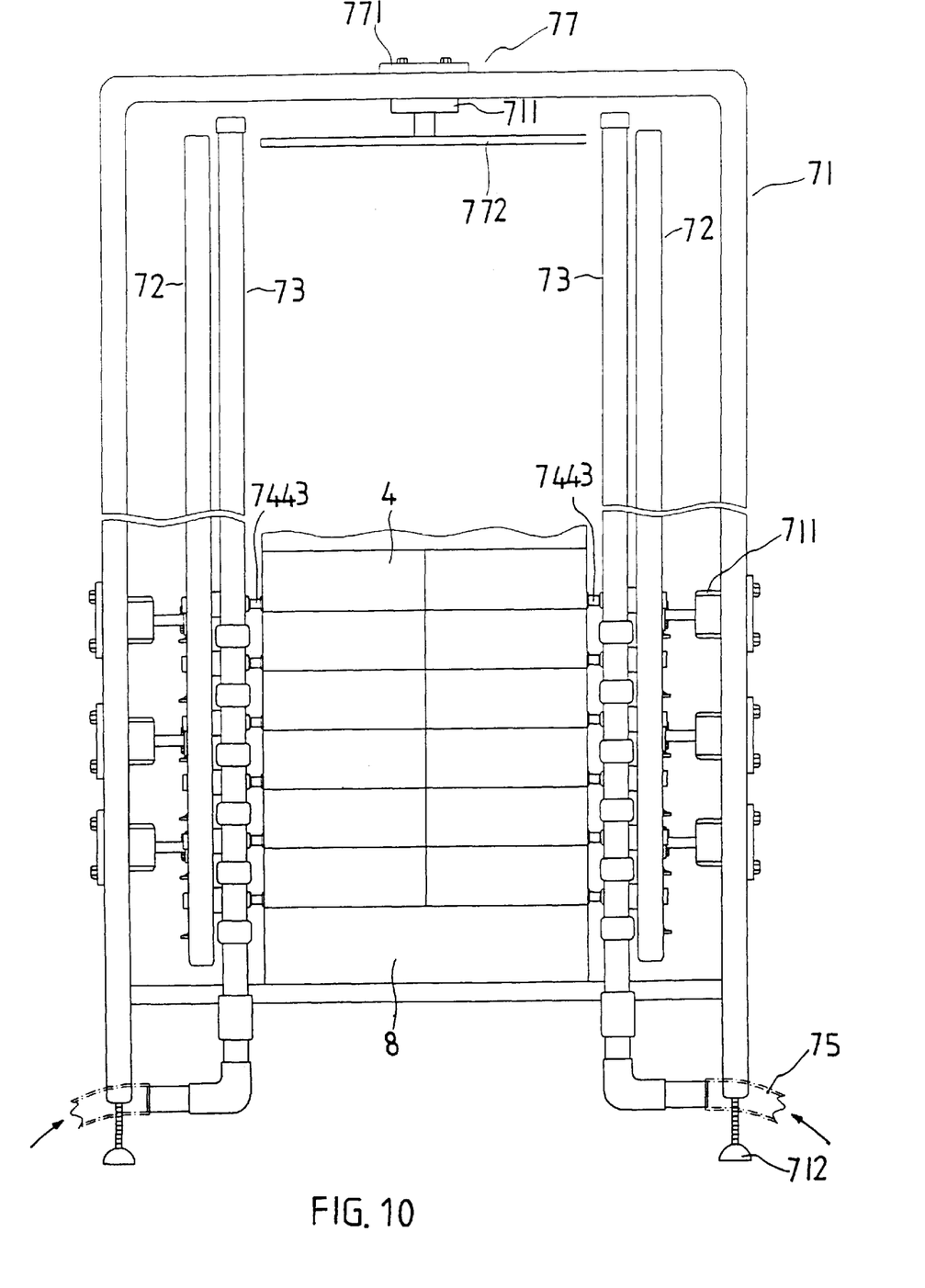
FIG. 10 is a side view of the preferred embodiment shown in FIG. 8.
Figure 11:
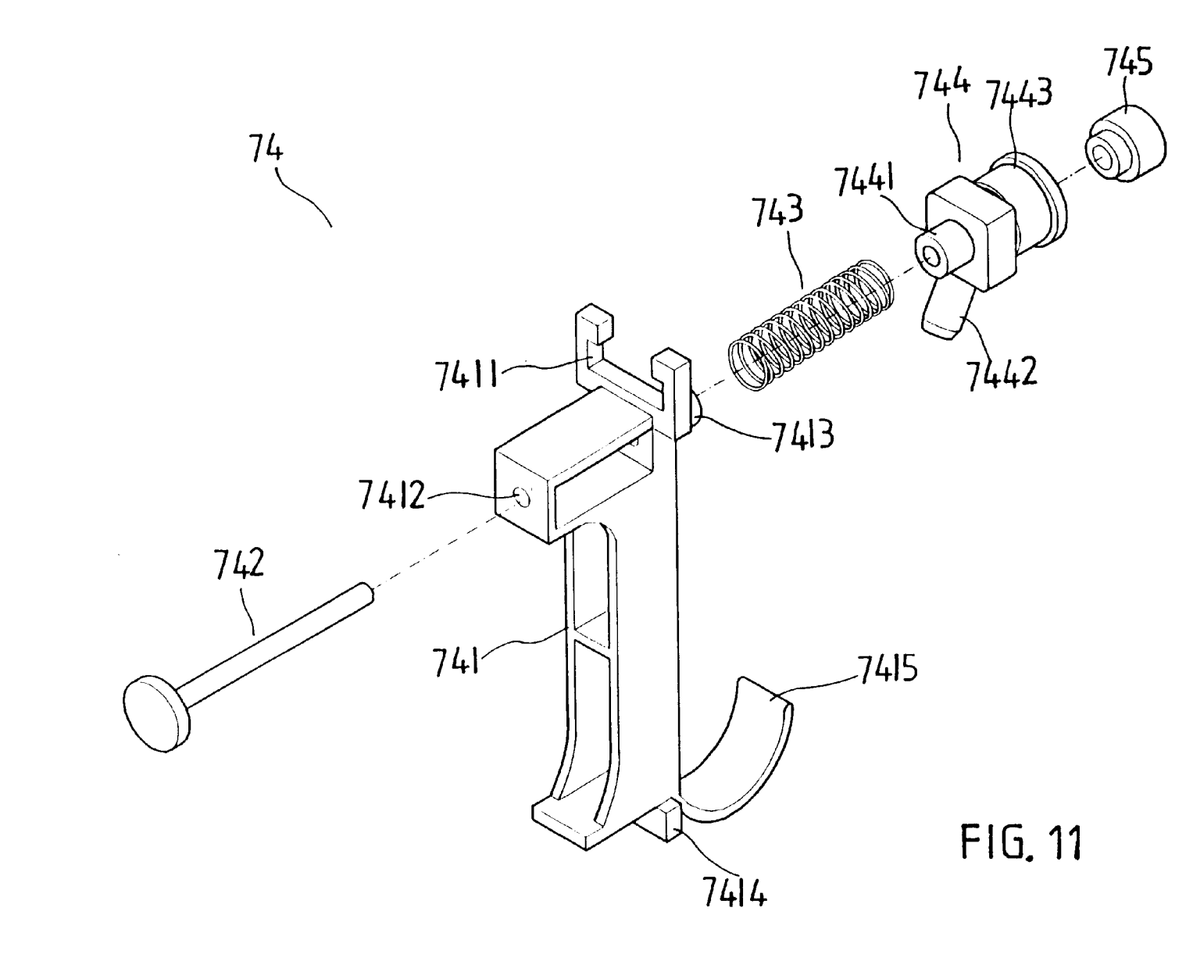
FIG. 11 is an exploded perspective view of the preferred water feeding connector according to the present invention.

FIG. 8 and FIG. 10 show the preferred engagement of the cultivation box 4 on a mobile platoon 8 with a water-feeding device 7. The stacking arrangement of cultivation boxes 4 can be optimally organized in accordance with the application field and the on-site transportation system. The water-feeding device 7 comprises a square locating frame 71 as an installation frame for the water-feeding device 7, which has substantial height and width for accommodating multiple cultivation boxes 4. The locating frame 71 further has a plurality of adjustable leg sets 712 at the bottom side of the locating frame 71 for standing, pairs of short cylinders 711 located symmetrically at proper locations with each piston bar engaging with the reinforce plate 722 of every suspending distribution frame 72 inside the locating frame 71. The locating frame 71 further has an air-pressed top cover 77 located on top of the locating frame 71. The air-pressed top cover 77 further has a plurality of short cylinders 711 equal-spaced installed beneath a transverse beam 771 above a top edge of the locating frame 71, and has a top cover plate 772 engaged with the piston bars of the short cylinders 711. While the cultivation boxes 4 are located inside the locating frame 71, the top cover plate 772 will be pushed down by short cylinders 711 to firmly anchor the cultivation boxes 4 for ensuring the engagement of the distribution frames 72, the water-feeding connecting piping 73, and the water-feeding connectors 74. The distribution frame 72 further has a plurality of parallel and equal-spaced locating strips 721 for fastening a pair of water feeding connectors 74. Preferably, the locating strip 721 can be H-shaped and be made of aluminum alloy or the like.

Figure 12:
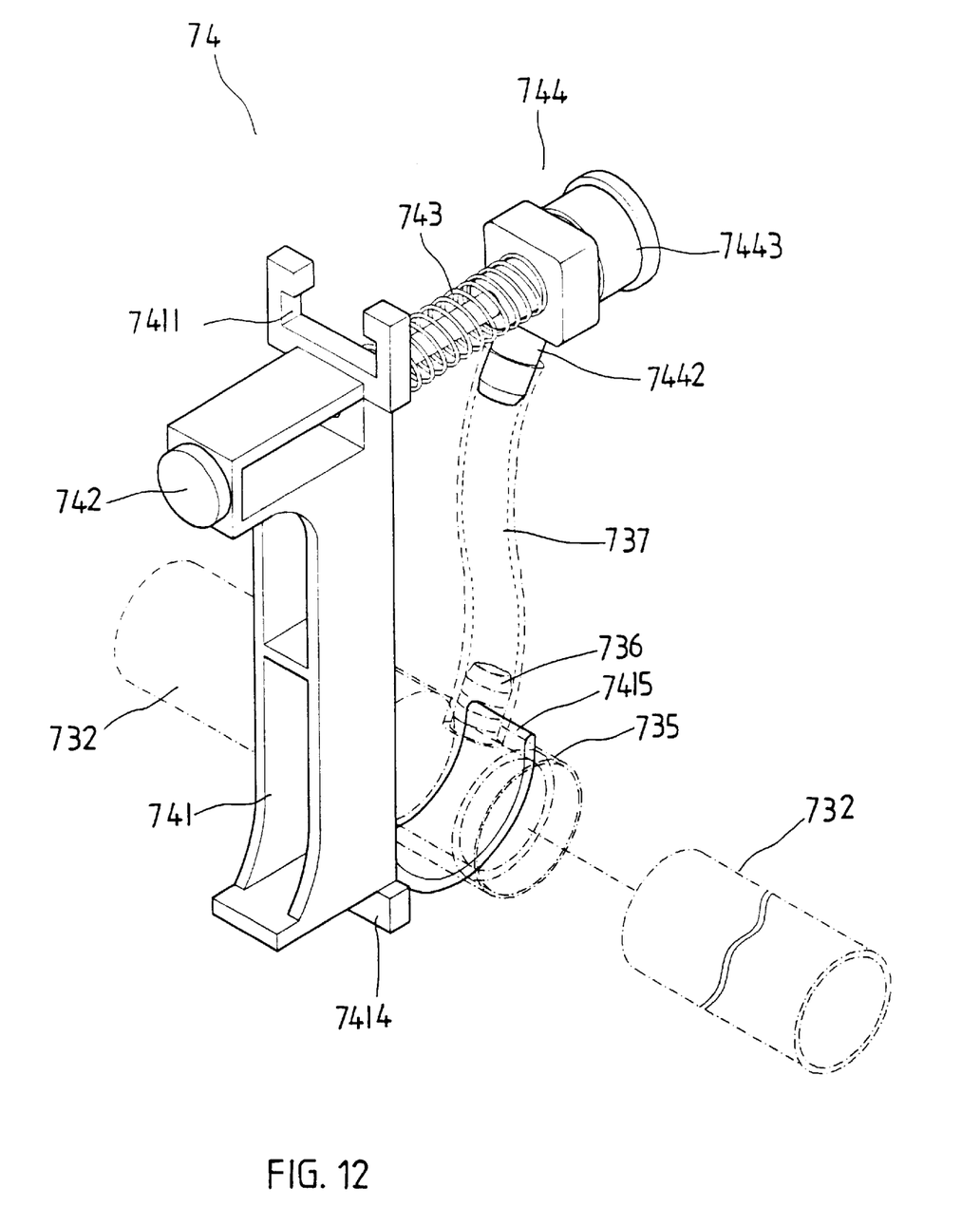
FIG. 12 is a schematic view showing the preferred water feeding connector and the relative piping in accordance with the present invention.
Figure 13:
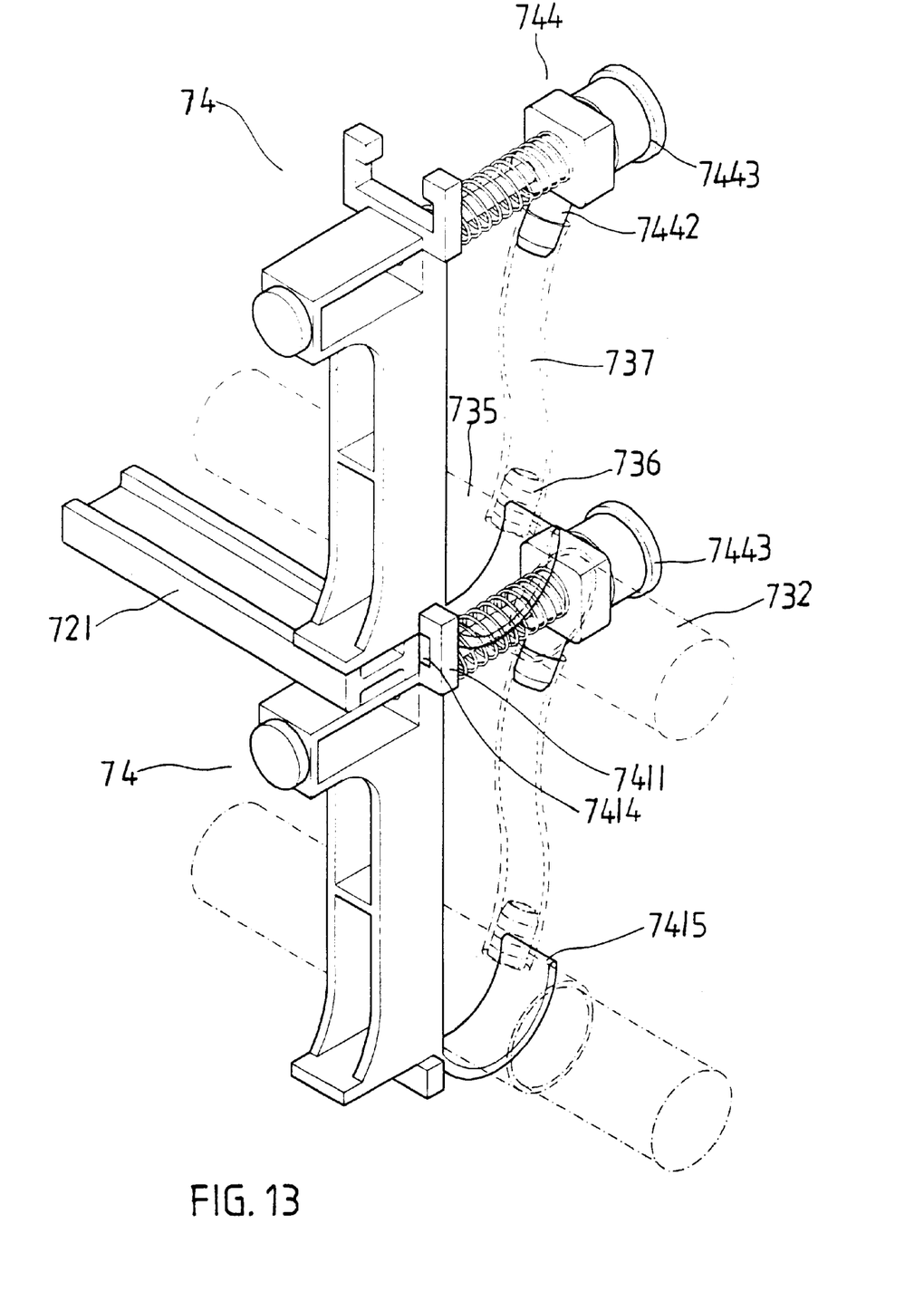
FIG. 13 is a schematic view showing the engagement of two water feeding connectors in accordance with the present invention.

Referring now to FIG. 1, the water-feeding connector 74 in accordance with the present invention comprises a T-shaped main body 741, a T-shaped pivot shaft 742, a spring 743, and a dual connector 744. The main body 741 further has an extruding U shaped engagement groove 7411 on top edge, a through hole 7412 for receiving the pivot shaft 742 located close to one side of the bottom edge, a locating pipe 7413 extruding from another side of the bottom edge, a symmetric engagement portion 7414 extruding from the bottom edges opposing the engagement grooves 7411 for engaging with the engagement groove 7411 of another water-feeding connector 74 (as shown in FIG. 13), and a hanger plate 7415 extruding from the side surface for horizontally locating the sub-supply pipe 732 of the water-feeding connecting piping 73 (as shown in FIG. 12). On the end of the dual connector 744 engaging the spring 743 is an extruding pipe 7441 for pipe-connection with one end of the spring 743. The pivot shaft 742 is connected to the extruding pipe 7441 after penetrating the through hole 7412 (as shown in FIG. 1). The dual connector 744 has a hollow connecting end 7443 having a rubber-made anti-leak sleeve 745 inside. For smooth water feeding after connecting the water-feeding connector 74 with the extruding external adapter 43 of the cultivation box 4, the dual connector 744 further comprises an oblique feeding head 7442 for connecting the hose 737 extended from the sub-supply pipe 732.

The water-feeding connecting piping 73 comprises a main supply pipe 731 at one end for connecting with the connecting hose pipe 75 to feed the water. The main supply pipe 731 further connects extended with a plurality of equal-spaced vertical sub-supply pipes 732 with individual water feeding control unit 733 and water leading control unit 734 for properly controlling the water circulation inside the cultivation box 4 within a default by air-pressure regulators, electromagnetic valves, or the like. The sub-supply pipes 732 are connected to the body 741 of the water-feeding connector 74 by a triad connector 735 for providing a third extruding head 736 to connect with a portion of the feeding hose pipe 737. Another head of the triad connector 735 is then connected with the connecting head 7442 of the dual connector 744 of the water-feeding connector 74. Preferably, the water from the sub-supply pipe 738 of the water-feeding connecting piping 73 can be recycled after a simple filtration process.

Figure 14:
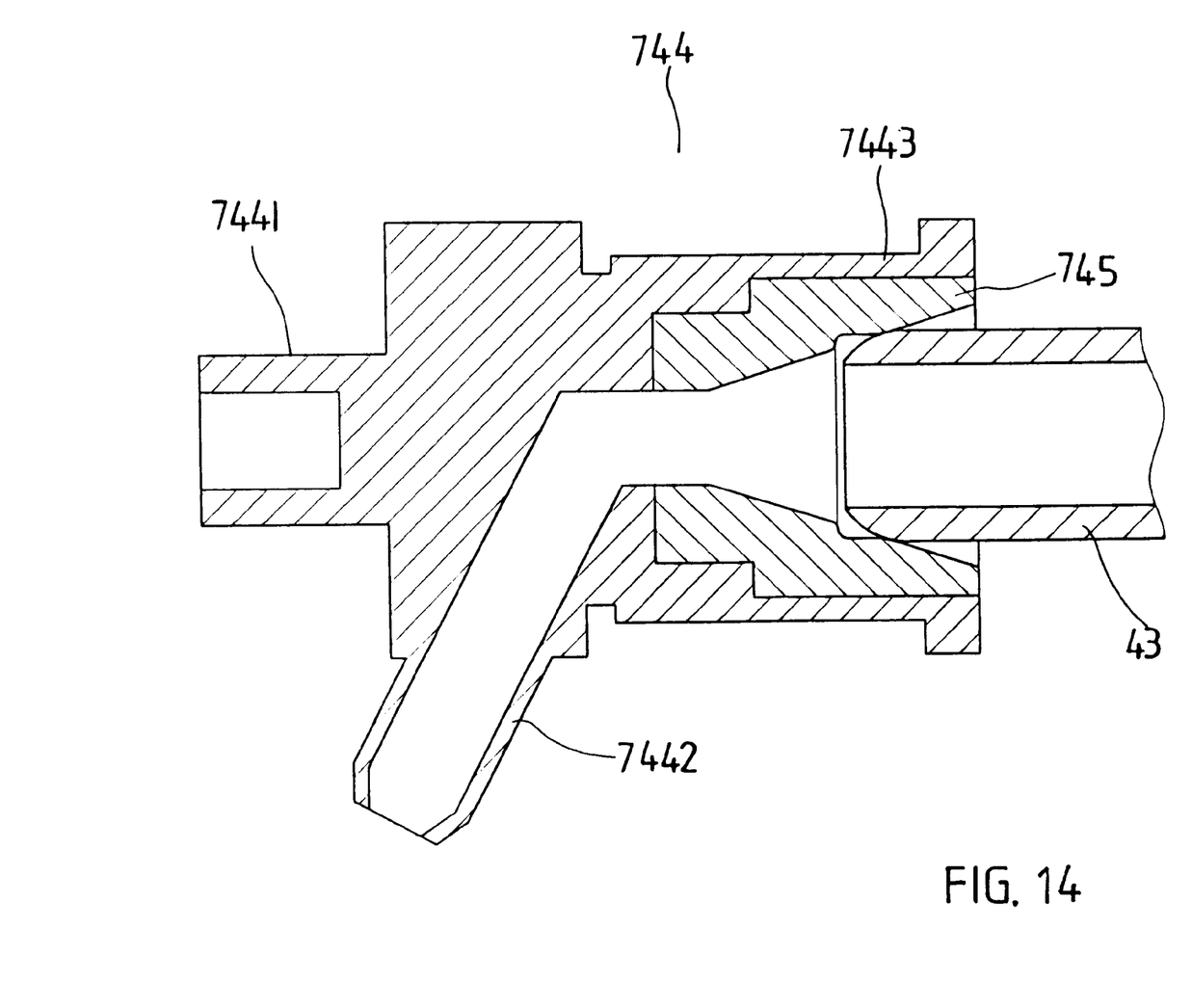
FIG. 14 is a cross section view showing the connection between the preferred dual connector of the water feeding connector and the extruding external water adopter of the cultivation box in accordance with the present invention.

Referring now to FIG. 10, right after two stacks of piling cultivation boxes 4 on mobile platoons 8 are positioned inside the locating frame 71 for automatic water feeding by the water-feeding device 7, the computer controlled short cylinders 711 and the air-pressed top cover 77 will be activated to push downwards the top cover plate 772 upon the top cultivation boxes 4 and to push, as well, inwards the distribution frames 72 upon side of the cultivation boxes 4 for firmly anchoring the whole assembly. At the same time, each connecting end 7443 of the dual connector 744 of the water-feeding connector 74 will engage closely with a corresponding extruding external water adapter 75 of a cultivation box 4 (as shown in FIG. 14) and the water will be continuously fed through the connecting hose pipe 75. The layer-wise water-feeding management in accordance with the present invention has the water feeding control unit 733 and the water leading control unit 734 normally at close status. While water-feeding is necessary, the water feeding control unit 733 located at top sub-supply pipe 732 will be ordered to open and supply the water at fix flow rate to the cultivation box 4 through the feeding hose 737 and the extruding external water connector 43. After supplying a substantial amount of water into the cultivation box 4, the water feeding control unit 733 will shut the water flow and the water in the cultivation boxes 4 of the same layer will be automatically balanced. After a proper duration, the water leading control unit 734 will be open and the water inside the cultivation box 4 will be led out through the sub-leading pipe 738, and further via the leading connection hose pipe 76 to a simple filtration apparatus for recycling the water. Similarly, the aforesaid water circulation management at the top layer is applied to other layers of the cultivation boxes assembly.

As long as the sprout is fully growing, the short cylinders 711 will pull back the piston bars to their origins for releasing the connection between the extruding external water connector 43 and the water-feeding connector 74. Then, the cultivation boxes 4 can be moved with the mobile platoons 8 to the following process stations.

According to the present invention, external piping is constructed to provide and lead-out the water in time for sprout cultivation boxes, by computer controlling the water feeding control units and the water leading control units. By providing the cultivation box capable of stacking application and the 3-D piping network, a 3-D sprout cultivation is then achieved.

In the sprout cultivation industry in Japan no chemical except artificial $C_2H_4$ and $N_2$ can be added to promote the cultivating. As a matter of fact, a complete cultivation needs 7–8 days in summer and 10–12 days in winter to obtain the sprout 9–10 times weight of the origin bean. However, about 30% of the sprouts will be infertile or bacteria-contaminated. The finished sprouts can only be stored in a freezer for 3–4 days without rotting.

On the other hand, in accordance with the present invention, the application of elastic physical pressure over the growing sprouts by the elastic covers over the cultivation boxes will force the sprout to generate mass amounts of stress ethylene to self-promote growth. Moreover, the oxidation of the stress ethylene (known as oxide ethylene) will inhibit the bacteria growth, and thus better sprout yield and quality can be rendered. By applying the present invention, about 3.5–4 days are needed to have a complete sprout cultivation with the sprout 13–14 times weight of the origin bean, no matter if in winter or in summer. Due to lack of bacteria, the sprouts obtained by applying the present invention can be stored in a freezer for about 2 weeks. Obviously, the present invention is superior to any work in the art.

While the present invention has been particularly shown and described with reference to preferred embodiments, it will be understood by those skilled in the art that various changes in form and detail may be made without departing from the spirit and scope of the present invention.

What is claimed is:

1. A sprout cultivation box with an automatic water regulating and balancing device which can be used to form a multiple-layer cultivation tower by stacking a plurality of said sprout cultivation boxes, comprising:

a cultivation box, which is a reinforce cultivation box and can be used for duplication stacking, having an extruding external water adapter located thereoutsideof, a lower flange located exterior therebottomof for duplicating stacking, an upper flange located exterior theretopof, a plurality of equal-height spacing bumps located interior therebottomof, a pair of shallow square valleys located interior on opposing side walls thereof, and at least an anchoring set with a hooking end located interior along the side edge therebottomof;

a permeable elastic cover, with a plurality of inter-cross interior reinforce ribs integrated as a whole and a plurality of holes therebottomof for permeation, and having a pair of hook sets located each thereof at an opposing lateral side for—firm—connection with spring belts;

a carrier plate, with a plurality of tiny compartments therebottomof for anchoring beans and for corresponding to said inter-cross interior of said permeable elastic cover, and having the thickness substantially for said beans to expand after soakage;

an elastic engaging means for rapidly connecting and disassembling said spring belts, with a maneuvering bar extending downward and separating to form a pair of across plates, and said across plate further comprising therebottomof a locating cut and an extruding release tip; and a water-feeding device for precisely and automatically regulating the water circulation inside said sprout cultivation box.

2. The sprout cultivation box with an automatic water regulating and balancing device according to claim 1, wherein each hook set of said pair of hook sets of said permeable elastic cover further comprises a reinforce protective plate thereof facing outward.

3. The sprout cultivation box with an automatic water regulating and balancing device according to claim 1, wherein said spring belt of said permeable elastic cover is made of plastic material with substantial elasticity.

4. The sprout cultivation box with an automatic water regulating and balancing device according to claim 1, wherein said spring belt of said permeable elastic cover is a tensile spring with substantial spring stiffness.

5. The sprout cultivation box with an automatic water regulating and balancing device according to claim 1, wherein said elastic engaging means can be operated by a robot with proper rotational capability.

6. The sprout cultivation box with an automatic water regulating and balancing device according to claim 1, wherein said extruding external water adapter of said cultivation box further comprises an integrated filtering screen thereinside.

7. The sprout cultivation box with an automatic water regulating and balancing device according to claim 1, wherein said water-feeding device is installed externally close to said extruding external water adapter of said cultivation box; further comprising a locating frame with substantial height and width to accommodate multiple said cultivation boxes, a plurality of adjustable leg sets at the bottom side of said locating frame for standing, pairs of short cylinders located symmetrically at proper locations for anchoring suspending distribution frames inside said locating frame by cylinder bars thereof, and a air-pressed top cover located above top edge of said locating frame having a transverse beam to install thereon a plurality of downward short cylinders with cylinder bars connected with a top cover plate for pressing firmly said cultivation boxes piled inside said locating frame; herein said locating frame further including a plurality of parallel and equal-spaced locating strips for fastening a pair of water feeding connectors, and a water feeding piping hose-connected with a main supply pipe, and said main supply pipe herein further comprising a plurality of parallel and equal-spaced sub-supply pipes connected with each said cultivation box and with individual water feeding control units and water leading control units for properly controlling the water circulation inside said cultivation box.

8. The sprout cultivation box with an automatic water regulating and balancing device according to claim 7, wherein said water feeding control unit and said water leading control unit are regulated by air-pressure regulators for accurately monitoring the water-feeding of said sub-supply pipes.

9. The sprout cultivation box with an automatic water regulating and balancing device according to claim 7, wherein said water feeding connector further comprises a main body, a pivot shaft, a spring, and a dual connector; herein said main body having theretopof an' extruding U shaped engagement groove, a through hole for receiving said pivot shaft located close to one side of the bottom edge thereof, a locating pipe extruding from another side of the bottom edge thereof, a symmetric engagement portion extruding from the bottom edges of said opposing engagement grooves, and a hanger plate extruding from said bottom edges of said opposing engagement grooves; herein said pivot shaft connected with said dual connector thereof at one end after said pivot shaft penetrating said main body and said spring; and the end of herein said dual connector connected with said spring further connected overlapping with said locating pipe, and another end of said dual connector having a waterproof sleeve thereinsideof and said dual connector having therebeneathof an oblique feeding head hose-connected with said sub-supply pipe.

10. The sprout cultivation box with an automatic water regulating and balancing device according to claim 7, wherein said locating strip is H-shaped and is made of aluminum alloy material.

11. The sprout cultivation box with an automatic water regulating and balancing device according to claim 7, wherein said water feeding control unit and said water leading control unit are regulated by electromagnetic valves for accurately monitoring the water-feeding of said sub-supply pipes.

* * * * *